(12) United States Patent
Hosangadi et al.

(10) Patent No.: US 9,300,431 B2
(45) Date of Patent: Mar. 29, 2016

(54) APPARATUS, METHOD AND COMPUTER READABLE MEDIUM FOR PAYLOAD SEGMENTATION OF WIRELESS PACKET DATA TRANSMISSIONS

(75) Inventors: Gurudutt S. Hosangadi, Hackettstown, NJ (US); Patrick G. V. Charriere, Letcombe Regis (GB)

(73) Assignee: Alcatel Lucent, Boulogne-Billancourt (FR)

( * ) Notice: Subject to any disclaimer, the term of this patent is extended or adjusted under 35 U.S.C. 154(b) by 641 days.

(21) Appl. No.: 13/487,483

(22) Filed: Jun. 4, 2012

(65) Prior Publication Data

US 2013/0322349 A1    Dec. 5, 2013

(51) Int. Cl.
*H04W 4/00* (2009.01)
*H04L 1/00* (2006.01)
*H04L 1/20* (2006.01)
*H04L 5/00* (2006.01)

(52) U.S. Cl.
CPC ............ *H04L 1/0005* (2013.01); *H04L 1/0011* (2013.01); *H04L 1/0018* (2013.01); *H04L 1/0025* (2013.01); *H04L 1/203* (2013.01); *H04L 5/006* (2013.01); *H04L 5/0046* (2013.01); *H04L 5/0094* (2013.01)

(58) Field of Classification Search
CPC .............................. H04L 1/203; H04L 5/0094
USPC .......................................................... 370/329
See application file for complete search history.

(56) References Cited

U.S. PATENT DOCUMENTS

| 2008/0220806 | A1* | 9/2008 | Shin et al. ............... 455/522 |
| 2008/0233992 | A1* | 9/2008 | Oteri et al. .............. 455/522 |
| 2009/0110087 | A1 | 4/2009 | Liu et al. |
| 2010/0271963 | A1 | 10/2010 | Koorapaty et al. |
| 2011/0268065 | A1 | 11/2011 | Park et al. |
| 2012/0113831 | A1* | 5/2012 | Pelletier et al. ......... 370/252 |

OTHER PUBLICATIONS

International Search Report (PCT/ISA/210) dated Aug. 2, 2013 for International Application No. PCT/US2013/043523.
Written Opinion of the International Searching Authority (PCT/ISA/237) dated Aug. 2, 2013 for International Application No. PCT/US2013/043523.

* cited by examiner

*Primary Examiner* — Shaq Taha
(74) *Attorney, Agent, or Firm* — Harness, Dickey & Pierce, P.L.C.

(57) ABSTRACT

The method includes determining a minimum number of resource blocks that can be assigned to a user equipment for delay sensitive traffic; determining a maximum number of resource blocks for allocation to data based on a transmit power setting; allocating a number of resource blocks to the uplink data transmission based on the minimum number of resource blocks and the maximum number of resource blocks for segmentation as segmented data; predicting a Signal to Noise+Interference ratio (SINR) based on the allocated number of resource blocks; assigning a modulation and coding scheme (MCS) to a wireless transmission based on the predicted SINR and a threshold MCS; and transmitting scheduling information to the user equipment, the scheduling information including the allocated number of resource blocks and the assigned MCS.

19 Claims, 6 Drawing Sheets

FIG. 6

APPARATUS, METHOD AND COMPUTER READABLE MEDIUM FOR PAYLOAD SEGMENTATION OF WIRELESS PACKET DATA TRANSMISSIONS

BACKGROUND OF THE INVENTION

Embodiments relate to wireless data transmissions. For example, scheduling wireless transmission of segmented voice data.

In wireless packet data networks for services with low packet delay budget constraints (e.g., voice over IP (VoIP) or conversational video services), constraints (e.g., quality) may be observed. For example, constraints based on residual Block Error Rate (rBLER) and packet transfer delays may be observed.

In poor radio coverage scenarios (e.g., user equipment on cell edges) when the packet data scheduler struggles to maintain an Initial Block Error Rate (iBLER) performance, the packet data scheduler provides for the transmission of VoIP packet data under a constraint that the total amount of power used for the transmission cannot be increased (e.g., current transmissions are at maximum power). In such a scenario, the typical behavior of the radio interface packet data scheduler is to instruct the user equipment to segment the packets which allows for the use of a more robust Modulation and Coding Scheme (MCS) for the transmission of each individual packet (e.g., less data is transmitted over a time interval which requires less power for transmission).

The number of payload bits per transmission is consequently reduced, thereby increasing the amount of power per transmitted bit. This leads to an improved iBLER performance.

However, packet segmentation introduces delay to the transmission of the packet by the user equipment and introduces a bottleneck to the maximum useful bit rate that can be achieved on the radio link (because the number of bits per transmission time interval (TTI) is restricted). Beyond a critical level of segmentation (i.e. below a minimum payload size per TTI) the radio link throughput becomes lower than the service data rate; and the overall packet delay starts to build up (e.g., accumulate) inferring that the support of the service with low packet delay constraint is no longer viable.

This "uncontrolled packet segmentation" by the user equipment requires the user equipment to add an additional header to facilitate the reassembly of the packet at the receiver (e.g., eNodeB). Higher levels of segmentation lead to higher ratios of overhead, which degrades the efficiency of the transmission. Further, beyond a critical level of segmentation (i.e. below a minimum payload size per TTI), the radio link throughput becomes lower than the service data rate and the overall packet delay start to build up (e.g., accumulate) inferring that support of the service with low packet delay constraint is no longer viable.

SUMMARY OF THE INVENTION

One embodiment includes a method. The method includes determining a minimum number of resource blocks that can be assigned to a user equipment for delay sensitive traffic; determining a maximum number of resource blocks for allocation to data based on a transmit power setting; allocating a number of resource blocks to the uplink data transmission based on the minimum number of resource blocks and the maximum number of resource blocks for segmentation as segmented data; predicting a Signal to Noise+Interference ratio (SINR) based on the allocated number of resource blocks; assigning a modulation and coding scheme (MCS) to a wireless transmission based on the predicted SINR and a threshold MCS; and transmitting scheduling information to the user equipment, the scheduling information including the allocated number of resource blocks and the assigned MCS.

Another embodiment includes a network element (e.g., eNodeB). The network element includes a memory and a processor communicatively coupled to the memory. The processor is configured to determine a minimum number of resource blocks that can be assigned to a user equipment for delay sensitive traffic, determine a maximum number of resource blocks for allocation to data based on a transmit power setting allocate a number of resource blocks to the uplink data transmission based on the minimum number of resource blocks and the maximum number of resource blocks for segmentation as segmented data, predict a Signal to Noise+Interference ratio (SINR) based on the allocated number of resource blocks, assign a modulation and coding scheme (MCS) to a wireless transmission based on the predicted SINR and a threshold MCS, and transmit scheduling information to the user equipment, the scheduling information including the allocated number of resource blocks and the assigned MCS.

Another embodiment includes a user equipment. The user equipment includes a memory and a processor communicatively coupled to the memory. The processor is configured to receive a scheduling message, the scheduling message including an allocated number of resource blocks and an assigned modulation and coding scheme (MCS). The allocated number of resource blocks is based on a minimum number of resource blocks that can be assigned to the user equipment for delay sensitive traffic and a maximum number of resource blocks for allocation to data based on a transmit power setting. The MCS is based on a predicted Signal to Noise+Interference ratio (SINR) based on the allocated number of resource blocks and a threshold MCS. The processor is further configured to segment encoded data based on the allocated number of resource blocks and transmit the segmented encoded data over an uplink channel to a network element using the MCS.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

As used herein, the term "mobile unit" may be considered synonymous to, and may hereafter be occasionally referred to, as a client, user equipment, mobile station, mobile user, mobile, subscriber, user, remote station, access terminal, receiver, etc., and may describe a remote user of wireless resources in a wireless communication network.

Similarly, as used herein, the term "evolved Node B" or "eNodeB" may be considered synonymous to, and may hereafter be occasionally referred to, as a Node B, base station, base transceiver station (BTS), etc., and may describe a transceiver in communication with and providing wireless resources to mobiles in a wireless communication network which may span multiple technology generations. As discussed herein, base stations may have all functionally associated with conventional, well-known base stations in addition to the capability to perform the methods discussed herein.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Figure 1:
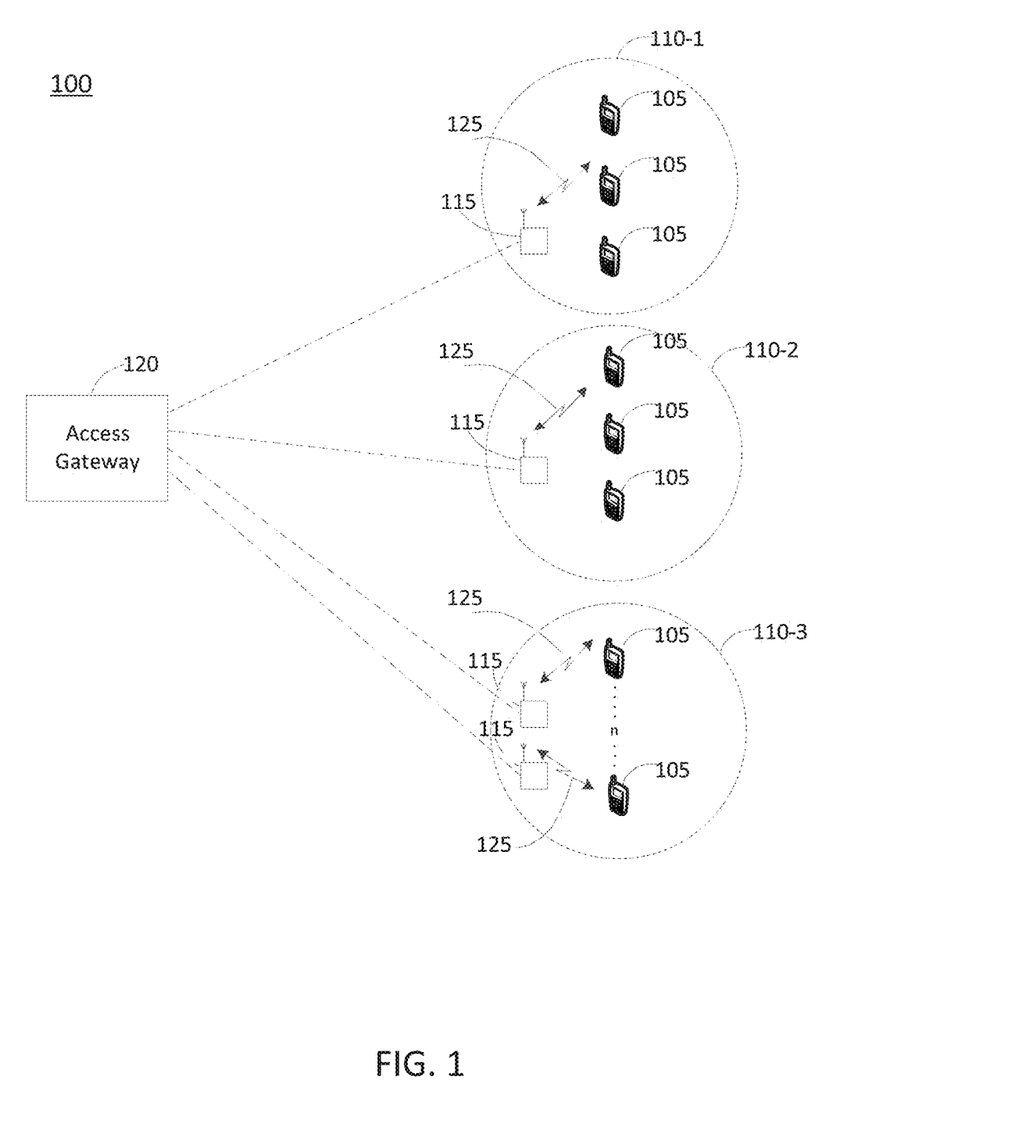
FIG. 1 illustrates a block diagram of a wireless communication network according to example embodiments.

FIG. 1 illustrates a wireless communication network 100 that includes an access gateway 120 having one or more associated eNodeBs 115. The access gateway 120 coverage area may include a plurality of cells 110-1, 110-2, 110-3.

The wireless communication network 100 may be an Evolved Universal Terrestrial Radio Access Network (E-UTRAN). Long Term Evolution (LTE) is the name given to a project to improve the Universal Mobile Telecommunications System (UMTS) standard to cope with future requirements. In one aspect, UMTS has been modified to provide for the E-UTRAN as a fourth generation (4G) wireless network.

An E-UTRAN may include eNodeBs 115, which provide the Evolved Universal Terrestrial Radio Access (E-UTRA) user plane (PDCP/RLC/MAC/PHY) and control plane (RRC) protocol terminations with a user equipment (UE) 105. The eNodeBs may be interconnected with each other by respective X2 interface.

As discussed herein, eNodeB 115 refers to a base station that provides radio access to UEs 105 within a given coverage area (e.g., 110-1, 110-2, 110-3). This coverage area is referred to as a cell. However, as is known, multiple cells are often associated with a single eNodeB.

As is known, the access gateway 120 controls, inter alia, user radio access network (RAN) mobility management procedures and user session management procedures. Channel 125 may provide uplink (UL) and downlink (DL) channels for signaling and data transmissions. For example, channel 125 may provide a channel for Broadcast Control Channel (BCCH), Physical Uplink Control Channel (PUCCH), Physical Uplink Shared Channel (PUSCH), Physical Downlink Control Channel (PDCCH), Physical Downlink Shared Channel (PDSCH) and the like.

Typically, peak rates (e.g., uplink and down link data rates) are not achievable because peak rates require channel conditions to be good enough to use a high modulation order and little coding redundancy (high code rates). Therefore, an error rate criterion (e.g., block error rates (BLER) are used to determine a possible data rate. Selection of data rates is typically called link adaptation. In LTE, the link adaptation chooses the Modulation and Coding Scheme (MCS), based on Signal to Interference and Noise Ratio (SINR) estimates. SINR estimates may be measured on a reference signal as detected by the receiver (e.g., UE 105).

The data rate may be determined by the chosen MCS and the error rate may depend on the MCS and the prevailing channel quality. A higher order modulation scheme such as the known 64QAM or 16QAM may allow more bits per modulation symbol (as compared to a lower order modulation scheme), which allows a higher data rate and bandwidth efficiency, while at the same time requiring better SINR at the receiver for relatively error-free demodulation. Similarly a high code rate may reduce redundancy at the cost of lower error correction capability.

Figure 2:
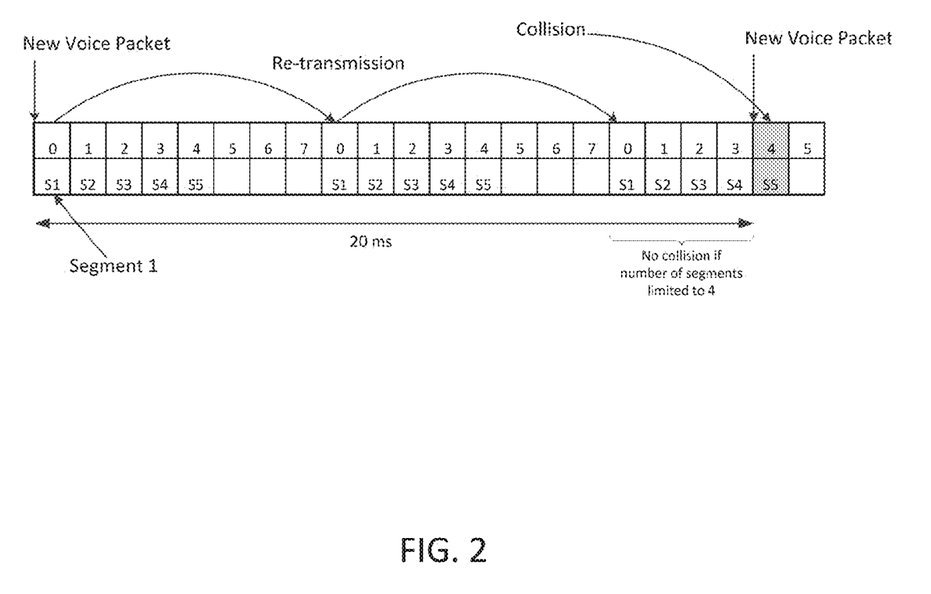
FIG. 2 illustrates wireless transmission of physical resource blocks (PRB).

FIG. 2 illustrates wireless transmission of physical resource blocks (PRB). As shown in FIG. 2 the transmission of a PRB occurs over a time slot (repeatedly labeled as 0-7). A grouping of the time slots (one set labeled as 0-7) is typically known in the art as a HARQ process index. The number of time slots in the HARQ process index is a design choice. A time slot may have a fixed time. The fixed time is a design choice. Typically, the time slot is approximately 1 ms. The time slot is known in the art as a transmission time interval (TTI). The time slot is typically assigned/scheduled as a resource block or a PRB over which data packets are transmitted.

If the wireless network (e.g., wireless communication network 100) is used to communicate voice data (e.g., VOIP), the voice data is typically scheduled over fixed time intervals. The fixed time interval is a design choice. For example, the fixed time interval may be based on a Codec used by the user equipment to encode voice data. Codecs are known in the art and generally refer to a program to encode a data stream or signal (e.g., used in videoconferencing, streaming media and video applications) for transmission, storage or encryption, or decodes data stream or signal for playback or editing. FIG. 2 illustrates the fixed time interval as 20 ms.

In poor radio coverage scenarios (e.g., user equipment on cell edges) when the packet data scheduler struggles to maintain an Initial Block Error Rate (iBLER) performance the scheduler has been programmed to provide for the transmission of VoIP packet data and the total amount of power used for the transmission cannot be increased. In such scenario, the typical function of the radio interface packet data scheduler is to instruct the user equipment (e.g., UE 105) to segment the packets to allow the use of more robust modulation and coding scheme (MCS) for the transmission of each individual packet. This segmentation is shown as S1-S5 in FIG. 2.

The number of payload bits per transmission is consequently reduced, thereby increasing the amount of power per transmitted bit which in turns leads to an improved iBLER performance.

FIG. 2 illustrates an example where the scheduler instructs the user equipment to use five resource blocks. As a result, the user equipment breaks up a voice packet into 5 segments. In this example, if the segment labeled "s5" requires 3 or more transmissions to get a CRC pass, then a new voice packet (which arrives every 20 ms) will experience a delay in transmission.

If there are too many segments (e.g., S1-S5) being transmitted over a voice data time interval (e.g., 20 ms), the radio interface packet data scheduler may need to accumulate delay (because the user equipment has not satisfactorily transmitted all of the segments associated with a previous transmission) and/or instruct the user equipment to drop segments resulting in reduction in quality.

For example, FIG. 2 shows re-transmission (by the user equipment) of segments S1-S5. Re-transmission may occur if, for example, the data, as received by the receiver (e.g., eNodeB 115) has a decoding error. The last re-transmission shows segments S1-S4 being re-transmitted. However, segment S5 would need to be re-transmitted after the start of a new voice packet. As a result, there is a collision (highlighted transmission interval) of data and the radio interface packet data scheduler will drop segment S5 (e.g., end the re-transmission process). Alternatively, the radio interface packet data scheduler could choose to delay the transmission (by the user equipment) of the new voice packet which is known as accumulating delay.

Example embodiments may prevent and/or reduce the dropping of packets and the accumulation of delay. According to at least one example embodiment, the range of radio conditions (e.g., in poor radio coverage scenarios) may be extended where the conversational service (e.g., VOIP) is available by providing a minimum amount of useful data payload per transmission time interval (TTI). This may help prevent packet delay build up that may cause dropping of packets and/or accumulation of delay. Referring to FIG. 2, by limiting the minimum amount of useful data payload per TTI (e.g., PRB usage) appropriately such that the number of segments is limited to, for example 4, collisions with new incoming voice packets may be minimized and delay build-up can be limited.

This protection against delay build up is possibly done at the expense of the initial BLER performance. But given that conversational services only put a constraint on residual BLER (as opposed to initial BLER) and that in a modern packet system the residual BLER is much lower than the initial BLER because of, for example, HARQ re-transmissions, limiting the minimum amount of useful data payload per TTI may extend the range of radio conditions (e.g., in poor radio coverage scenarios) in which the conversational service is available. Therefore, example embodiments may limit the minimum amount of useful data payload per TTI in an LTE network by providing a minimum MCS or minimum number of PRB to a scheduling grant assigned to the UE.

Limiting the number of segments may degrade the packet error rate to some extent. However, this degradation may be reduced or minimized by providing a minimum number of PRBs. For example, transmitting a packet over 2 PRBs instead of 1 may improve the coding gain for the packet. For user equipment at a cell edge already transmitting at max power, transmitting a packet over 2 PRBs instead of 1 typically requires dividing the power between the 2 PRBs instead of 1. The increased coding gain has been found to be more beneficial than increased power for the cell edge user equipment.

Figure 3:
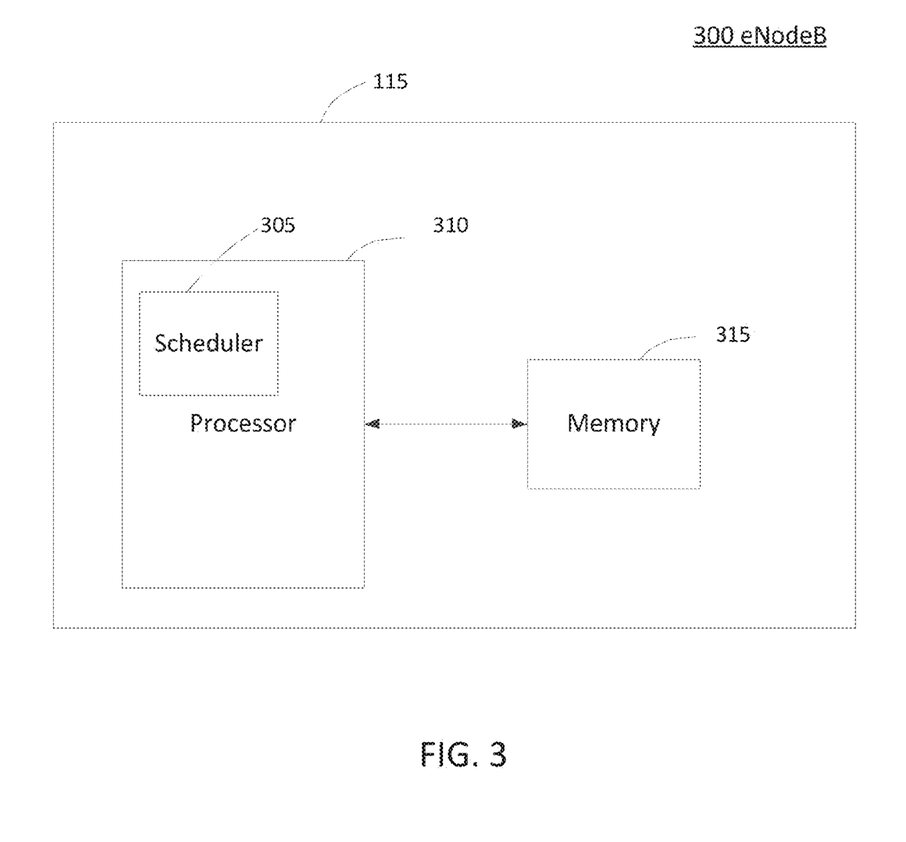
FIG. 3 illustrates an evolved Node B (eNodeB) according to an example embodiment.

FIG. 3 illustrates an evolved Node B (eNodeB) according to an example embodiment. As shown in FIG. 3, the eNodeB 115 includes, at least, a processor 310 and a memory 315. The processor includes a radio interface packet data scheduler 305 (hereinafter scheduler 305).

The processor 310 and the memory 315 operate together to run eNodeB functionality. For example, the memory 315 may store code segments regarding eNodeB functions (e.g., UE scheduling, control information signaling/handling and the like). The code segments may in-turn be executed by the processor 310. Further, the memory 315 may store process variables and constants for use by the processor 310.

Note also that the software implemented aspects of the example embodiments are typically encoded on some form of program storage medium (e.g., memory 315) or implemented over some type of transmission medium. The program storage medium (e.g., memory 315) may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Additional details regarding the processor 310 and the memory 315 are known to those skilled in the art and will not be discussed further for the sake of brevity.

The scheduler 305 may be configured to schedule transmissions to and from a user equipment (e.g., UE 105) based on pre-defined rules and/or quality targets and the like. Further details regarding the operation of the eNodeB 115, and more specifically the scheduler 305, are discussed below with regard to FIG. 4.

Figure 4:
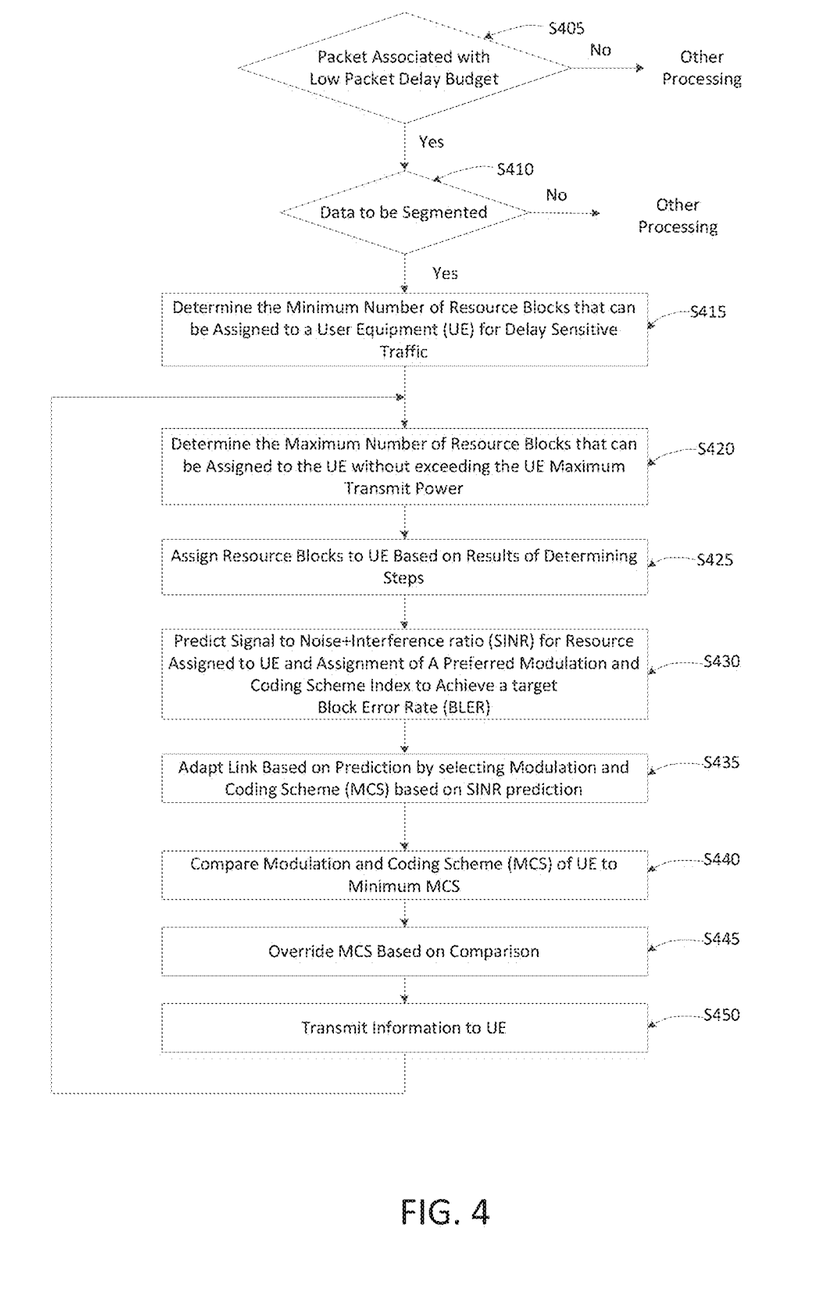
FIG. 4 illustrates a method for allocating resource blocks to scheduled uplink data transmissions in a wireless communication network according to an example embodiment.

FIG. 4 illustrates a method for allocating resource blocks to scheduled uplink data transmissions in a wireless communication network according to an example embodiment. While describing the steps of the method associated with FIG. 4, reference will be made to the network of FIG. 1 and the eNodeB 115 of FIG. 3. The steps of FIG. 4 may follow the typical steps associated with scheduling voice data by the eNodeB 115.

In step S405 the scheduler 305 determines if a scheduled data transmission (e.g., a scheduled data packet) is associated with a low packet delay budget transmission (e.g., VOIP data). For example, the scheduler 305 may read information from a header associated with a data packet containing the data. The information may include a data type. If the data type is voice data, the data transmission may be associated with a low packet delay budget transmission. Alternatively, the scheduler 305 may receive a message over a control channel (e.g., Physical Uplink Control Channel (PUCCH)) indicating the type of data to be transmitted by the user equipment.

As another example, the scheduler 305 may read a quality parameter associated with the data packet. If the quality parameter is a packet delay value and the value is less than a threshold, the data transmission may be associated with a low packet delay budget transmission. For example, the scheduler 305 may determine the QoS Identifier (QCI) of a radio bearer associated with the data packet. The QCI specifies the treatment of packets received on a specific bearer. For example, the Table 1 illustrates QCI are defined in 3GPP.

TABLE 1

| QCI | Resource Type | Priority | Packet Delay Budget | Packet Error Loss Rate | Example Services |
|---|---|---|---|---|---|
| 1 | GBR | 2 | 100 ms | $10^{-2}$ | Conversational Voice |
| 2 | GBR | 4 | 150 ms | $10^{-3}$ | Conversational Video (Live Streaming) |
| 3 | GBR | 5 | 300 ms | $10^{-6}$ | Non Conversational Video (Buffer and playback) |
| 4 | GBR | 3 | 50 ms | $10^{-3}$ | Real Time Gaming |
| 5 | Non-GBR | 1 | 100 ms | $10^{-6}$ | IMS Signaling |
| 6 | Non-GBR | 7 | 150 ms | $10^{-3}$ | Voice, Video, Interactive gaming |
| 7 | Non-GBR | 6 | 300 ms | $10^{-6}$ | Video (Buffer and playback) |
| 8 | Non-GBR | 8 | 300 ms | $10^{-6}$ | TCP Based |

The QCI may be signaled from a Core Network (not shown) to the scheduler upon creation of the radio bearer. The radio bearer is assigned a logical channel id at radio bearer setup. The scheduler 305 may determine the type of data (and QoS requirements associated with the data) the scheduler 305 has to schedule (e.g. based on a buffer status reports sent by UE). These reports may indicate how much data is awaiting transmission for a logical channel ID.

If the scheduled data transmission is not associated with a low packet delay budget transmission, processing proceeds to some other processing. Otherwise, processing continues to step S410.

In step S410 the scheduler 305 determines if data is to be segmented (or alternatively is segmented). For example, as discussed above, if the UE (e.g., UE 105) is in a poor radio coverage scenario (e.g., user equipment on cell edges) and transmit power is at a maximum power, the data may be segmented. Poor radio coverage may be determined using, for example, known Channel Quality Indication (CQI) reports sent by the UE. Alternatively, the scheduler 305 may use the UE power headroom reports combined with the uplink SINR information measured at the uplink receiver. If the data is not to be segmented, processing proceeds to some other processing. Otherwise, processing continues to step S415.

In step S415 the scheduler 305 determines the minimum number of resource blocks that can be assigned to a user equipment (e.g., UE 105) for delay sensitive traffic. For example, the scheduler 305 may determine the minimum number of resource blocks such that if the UE is in poor coverage conditions and data awaiting transmission is voice data (e.g., VoIP), then the minimum number of resource blocks is equal to a minimum threshold value greater than one (1) (e.g., determined as a system variable stored in memory 315). Otherwise, the minimum number of resource blocks is equal to one (1). The minimum number of resource blocks may be equal to a minimum threshold value greater than 1 if the user equipment is in a condition where the user equipment is transmitting at the user equipment's maximum uplink power to maintain a radio link and the user equipment is transmitting data with conversational quality of service (QoS) requirements.

In step S420 the scheduler 305 determines the maximum number of resource blocks that can be assigned to the UE without exceeding the UE maximum transmit power. For example, the maximum number of resource blocks that may be assigned to a UE may be based on the known power headroom reports sent by the UE to the eNodeB. For example, when the UE reports XdB headroom for a grant size of y resource blocks, then the maximum grant size before reaching power saturation may be $y*10^{(x/10)}$.

In step S425 the scheduler 305 assigns resource blocks to the UE based on the minimum number of resource blocks that can be assigned to a user equipment (step S415) and the maximum number of resource blocks that can be assigned to the UE without exceeding the UE maximum transmit power (step S420). For example, the scheduler 305 may assign resource blocks to the UE such that the number of resource blocks is greater than the minimum number of resource blocks that can be assigned to a user equipment and less than the maximum number of resource blocks that can be assigned to the UE without exceeding the UE maximum transmit power.

As discussed above, limiting the number of segments may degrade the packet error rate. Therefore, in step S430 the scheduler 305 predicts Signal to Noise+Interference ratio (SINR) for resources assigned to UE based on the number of assigned resource blocks. Further, the scheduler 305 assigns a preferred modulation and coding scheme (MCS) index to achieve a target Block Error Rate (BLER) based on the predicted SINR. For example, the SINR may be predicted based on an SINR observed for previous VoIP transmissions. Alternatively, the SINR may be predicted based on recent Sounding Channel Reference Symbol (SRS) observations or Channel Quality Information (CQI) reports from the UE (e.g., UE 105). The predicted SINR may be based on the user equipment power headroom reports and uplink SINR information measured at the uplink receiver. The MCS may be assigned using a look up table such that MCS=LUT(predicted SINR).

In step S435 the scheduler 305 adapts the link based on the predicted SINR (e.g., an error rate adjustment). For example, in LTE, link adaptation may be based on Adaptive Modulation and Coding (AMC). AMC may assign (e.g., adapt) the MCS such that if the predicted SINR is sufficiently high, higher-order modulation schemes with higher spectral efficiency (hence with higher bit rates) like 16QAM or 64QAM are used. In the case of poor predicted SINR, a lower-order modulation scheme like QPSK, which is more robust against transmission errors but has a lower spectral efficiency, is used.

AMC may adapt code rate such that for a given modulation scheme, an appropriate code rate can be chosen depending on the channel quality. The better the channel quality, the higher the code rate is used and, as a result, the higher the data rate.

In step S440 the scheduler 305 compares the modulation and coding scheme (MCS) of the UE to a minimum MCS. For example, the UE (e.g., UE 105) and/or the wireless network (e.g., wireless communication network 100) may have a minimum MCS threshold based on a guaranteed delay (e.g., quality of service parameter). The MCS set by the scheduler 305 may be compared to the minimum MCS threshold. The MCS threshold may be different depending on the number of PRB assigned to the UE (e.g., UE 105) and the guaranteed bit rate value required for the voice service.

In step S445 the scheduler 305 overrides the MCS of the UE based on the comparison. For example, if the assigned MCS is less than the minimum MCS threshold, scheduler 305 changes the assigned MCS to the minimum MCS threshold.

In step S450 the scheduler 305 transmits information (e.g., scheduling information) to the user equipment (e.g., UE 105). The information may include the allocated number of resource blocks and the assigned MCS. The information may be transmitted over a control or a signalling channel (e.g., the Physical Downlink Control Channel (PDCCH)).

According to example embodiments, the steps set out in FIG. 4 may improve the packet error rate for each segment of a voice packet and thereby improves the overall packet error rate and the quality of a voice call. For example, referring again to FIG. 2, the method described in FIG. 4 may result in allocation of four segments (S1-S4). Allocation of four segments may result in voice data transmissions without collisions and/or accumulating delay.

Figure 5:
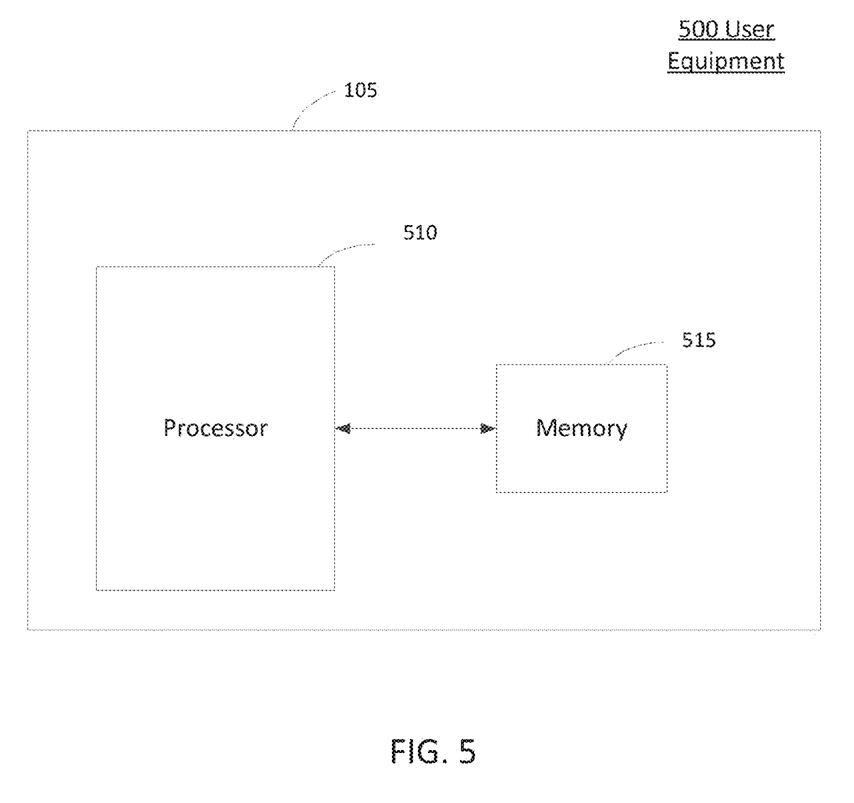
FIG. 5 illustrates user equipment according to an example embodiment.

FIG. 5 illustrates an user equipment (e.g., UE 105) according to an example embodiment. As shown in FIG. 5, the UE 105 includes, at least, a processor 510 and a memory 515. The processor 510 and the memory 515 operate together to run user equipment functionality. For example, the memory 515 may store code segments regarding user equipment functions (e.g., voice encoding, control information signaling/handling and the like). The code segments may in-turn be executed by the processor 510. Further, the memory 515 may store process variables and constants for use by the processor 510.

Note also that the software implemented aspects of the example embodiments are typically encoded on some form of program storage medium (e.g., memory 515) or implemented over some type of transmission medium. The program storage medium (e.g., memory 515) may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

With the exception of the details described below with regard to FIG. 6, additional details regarding the processor 510 and the memory 515 are known to those skilled in the art and will not be discussed further for the sake of brevity.

Figure 6:
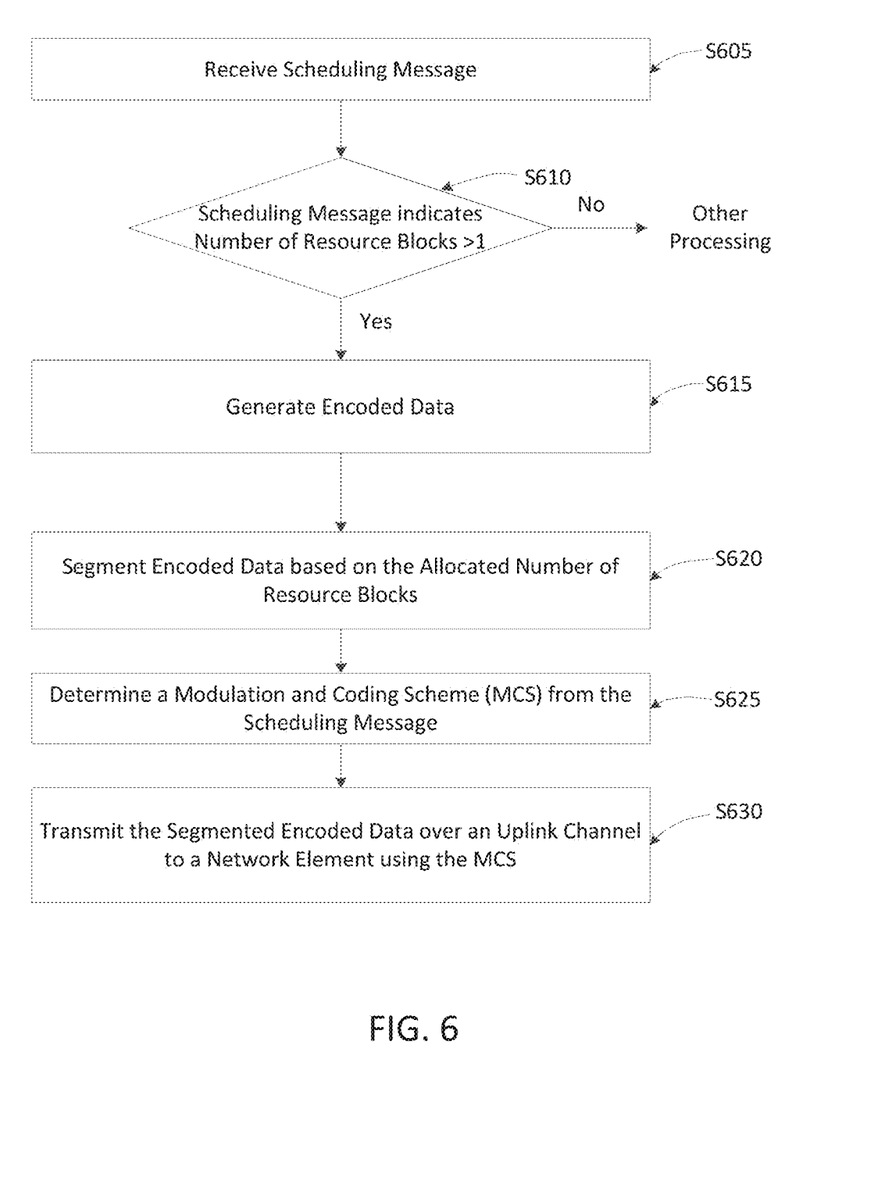
FIG. 6 illustrates a method for segmenting data in uplink data transmissions in a wireless communication network according to an example embodiment.

FIG. 6 illustrates a method for segmenting data in uplink data transmissions in a wireless communication network according to an example embodiment. While describing the steps of the method associated with FIG. 6, reference will be made to the network of FIG. 1 and the user equipment 105 of FIG. 5.

In step S605 the processor 510 receives a scheduling message. The scheduling message may include scheduling information including a number of allocated resource blocks and an assigned MCS. The number of allocated resource blocks and the assigned MCS are discussed in more detail above with regard to FIG. 4. The scheduling information may be received via a control or a signalling channel (e.g., the Physical Downlink Control Channel (PDCCH)).

In step S605 the processor 510 determines if the scheduling information includes an indication that the number of allocated resource blocks is greater than one (1). If the number of allocated resource blocks is not greater than one (1), processing proceeds to some other processing. Otherwise, processing continues to step S615.

In step S615, the processor 510 generates encoded data. For example the data (e.g., voice data) may be encoded using a known codec. Codecs are used by the user equipment (e.g., UE 105) to encode voice data. Codecs are known in the art and generally refer to a program to encode a data stream or signal (e.g., used in videoconferencing, streaming media and video applications) for transmission, storage or encryption, or decodes data stream or signal for playback or editing.

In step S620, the processor 510 segments the encoded data based on the allocated number of resource blocks. For example, if the allocated number of resource blocks equals four (4), the processor 510 segments the encoded data into four segments each including a same number of bits.

In step S625, the processor 510 determines an MCS from the scheduling information. The MCS is determined by the eNodeB and is discussed in more detail above with regard to FIG. 4.

In step S630, the processor 510 transmits the segmented encoded data over an uplink channel to a network element using the MCS. Transmitting data over an uplink channel to a network element using an MCS is known to those in the art and will not be discussed further for the sake of brevity.

While example embodiments have been particularly shown and described, it will be understood by one of ordinary skill in the art that variations in form and detail may be made therein without departing from the spirit and scope of the claims.

We claim:

1. A method for allocating resource blocks to scheduled uplink data transmissions, the method comprising:
    determining a minimum number of resource blocks that can be assigned to a user equipment for delay sensitive traffic;
    determining a maximum number of resource blocks for allocation to data based on a transmit power setting;
    allocating a number of resource blocks to the uplink data transmission based on the minimum number of resource blocks and the maximum number of resource blocks for segmentation as segmented data;
    predicting a Signal to Noise+Interference ratio (SINR) based on the allocated number of resource blocks;
    assigning a modulation and coding scheme (MCS) to a wireless transmission based on the predicted SINR and a threshold MCS; and
    transmitting scheduling information to the user equipment, the scheduling information including the allocated number of resource blocks and the assigned MCS.

2. The method of claim 1, wherein the number of allocated resource blocks is between the minimum number of resource blocks and the maximum number of resource blocks.

3. The method of claim 1, wherein the number of allocated resource blocks is the maximum number of resource blocks if the minimum number of resource blocks is greater than the maximum number of resource blocks.

4. The method of claim 1, wherein the minimum number of resource blocks is equal to a minimum threshold value greater than 1 if the user equipment is in a condition where the user equipment is transmitting at the user equipment's maximum uplink power to maintain a radio link and the user equipment is transmitting data with conversational quality of service (QoS) requirements.

5. The method of claim 1, wherein the predicted SINR is based on an SINR observed for previous data transmissions allocated over the number of resource blocks.

6. The method of claim 1, wherein the predicted SINR is based on the user equipment power headroom reports and uplink SINR information measured at the uplink receiver.

7. The method of claim 1, wherein the assigned MCS is looked-up in a look-up table using the predicted SINR.

8. The method of claim 1, wherein the assigned MCS is assigned such that a grant payload size is greater than a floor level, the floor level being determined such that there is no accumulated delay.

9. The method of claim 1, wherein the predicted SINR and the assigned MCS achieve a target Block Error Rate (BLER) for transmission of each segment of the segmented data.

10. A network element comprising:
    a memory; and
    a processor communicatively coupled to the memory, the processor configured to,
        determine a minimum number of resource blocks that can be assigned to a user equipment for delay sensitive traffic;
        determine a maximum number of resource blocks for allocation to data based on a transmit power setting;
        allocate a number of resource blocks to the uplink data transmission based on the minimum number of resource blocks and the maximum number of resource blocks for segmentation as segmented data;
        predict a Signal to Noise+Interference ratio (SINR) based on the allocated number of resource blocks;
        assign a modulation and coding scheme (MCS) to a wireless transmission based on the predicted SINR and a threshold MCS; and
        transmit scheduling information to the user equipment, the scheduling information including the allocated number of resource blocks and the assigned MCS.

11. The network element of claim 10, wherein the number of allocated resource blocks is between the minimum number of resource blocks and the maximum number of resource blocks.

12. The network element of claim 10, wherein the number of allocated resource blocks is the maximum number of resource blocks if the minimum number of resource blocks is greater than the maximum number of resource blocks.

13. The network element of claim 10, wherein the minimum number of resource blocks is equal to a minimum threshold value greater than 1 if the user equipment is in a condition where the user equipment is transmitting at the user equipment's maximum uplink power to maintain a radio link and the user equipment is transmitting data with conversational quality of service (QoS) requirements.

14. The network element of claim 10, wherein the predicted SINR is based on an SINR observed for previous data transmissions allocated over the number of resource blocks.

15. The network element of claim 10, wherein the predicted SINR is based on the user equipment power headroom reports and uplink SINR information measured at the uplink receiver.

16. The network element of claim 10, wherein the assigned MCS is looked-up in a look-up table using the predicted SINR.

17. The network element of claim 10, wherein the assigned MCS is assigned such that a grant payload size is greater than a floor level, the floor level being determined such that there is no accumulated delay.

18. The network element of claim 10, wherein the predicted SINR and the assigned MCS achieve a target Block Error Rate (BLER) for transmission of each segment of the segmented data.

19. A user equipment, comprising:
a memory; and
a processor communicatively coupled to the processor, the processor configured to,
  receive a scheduling message, the scheduling message including an allocated number of resource blocks and an assigned modulation and coding scheme (MCS), the allocated number of resource blocks being based on,
    a minimum number of resource blocks that can be assigned to the user equipment for delay sensitive traffic, and
    a maximum number of resource blocks for allocation to data, the maximum number of resource blocks being based on a transmit power setting,
  the MCS being based on a transmit based on a predicted Signal to Noise+Interference ratio (SINR), the predicted SINR ratio being based on the allocated number of resource blocks and a threshold MCS,
  segment encoded data based on the allocated number of resource blocks, and
  transmit the segmented encoded data over an uplink channel to a network element using the MCS.

* * * * *